United States Patent

[11] 3,611,863

| [72] | Inventors | Wolfgang Bayer<br>Pona, Eschen;<br>Konrad Kostlin, Vaduz; Wilfried<br>Imelmann, Vaduz, all of Liechtenstein |
|---|---|---|
| [21] | Appl. No. | 831,350 |
| [22] | Filed | June 9, 1969 |
| [45] | Patented | Oct. 12, 1971 |
| [73] | Assignee | Hilti Aktiengesellschaft<br>Schaan, Liechtenstein |
| [32] | Priority | June 24, 1968 |
| [33] | | Germany |
| [31] | | P 17 50 989.6 |

[54] FASTENING ELEMENT CONSTRUCTION
2 Claims, 3 Drawing Figs.

[52] U.S. Cl. ........................................... 85/10 E,
85/1 JP, 85/53
[51] Int. Cl. ........................................ F16b 15/02
[50] Field of Search ........................... 85/53, 55,
28, 1 JP, 10 E, 10

[56] References Cited
UNITED STATES PATENTS

| 19,007 | 12/1857 | Van Grieson................ | 85/55 |
| 1,335,756 | 4/1920 | Scarff........................... | 85/28 |
| 1,561,104 | 11/1925 | Oldfield........................ | 85/28 |
| 2,439,516 | 4/1948 | Holcomb...................... | 85/28 |
| 3,320,845 | 5/1967 | Eschweiler................... | 85/10 E |

FOREIGN PATENTS

| 17,479 | 10/1901 | Great Britain................ | 85/55 |
| 325,588 | 2/1930 | Great Britain................ | 85/53 |

*Primary Examiner*—Edward C. Allen
*Attorney*—McGlew and Toren

ABSTRACT: A fastening element such as a bolt, nail or similar device which is adapted to be driven into a hard receiving material such as steel or concrete includes a member having a shank portion with a pointed end and a head portion which is enclosed by a cap made of a stainless metal or rust-resistant metal. In addition, a washer or disk of ductile plastic material is arranged to surround a portion of the shank of the fastening element. The cap includes tabs which grip under the head portion and side portions which are adapted to bear into the ductile plastic when the fastening element is driven into the hard receiving material.

PATENTED OCT 12 1971 3,611,863

INVENTORS
WOLFGANG BAYER
KONRAD KÖSTLIN
WILFRIED IMELMANN

BY McGlew & Toren
ATTORNEYS

FASTENING ELEMENT CONSTRUCTION

SUMMARY OF THE INVENTION

This invention relates, in general, to the construction of anchoring devices or fastening elements and, in particular, to a new and useful bolt, nail or similar structure which is adapted to be driven into a hard receiving material such as a steel sheet and which includes a cap over the head and a ductile plastic washer construction on its shank for forming a corrosion-resistant enclosure over the fastening element.

The present invention is particularly concerned with providing fastening elements for fastening sheet materials in a manner such that they are sealed against corrosion particularly at the point of the penetration of the fastening element or nail. Such sheet materials are subjected to corrosion both from atmospheric conditions and by contact. It has been known to apply sealing caps made of plastic which are either screwed or hammered into the fastening elements, but the application of such sealing caps requires that they be screwed or hammered on and thus this is an additional operational time requirement. Those sealing caps which are hammered on have the disadvantage of having only a limited sealing fit and, as a consequence, corrosion of the fastening element to be protected is not fully prevented. The use of rust-resistant or stainless materials for the fastening element is not possible because of the poor strength of the material for the direct fastening in this arrangement.

In accordance with the present invention, there is provided a fastening element which does not have the disadvantages mentioned above and which includes a cap of stainless or rust-resistant metal which encompasses the head portion of the fastening element and which becomes engaged with a disk of ductile plastic. The plastic, in the form of a washer or disk is disposed around the shaft of the fastening element after the fastening element is driven into the receiving material. The ductile plastic disk is positioned to surround the lower portion of the shaft or shank portion of the fastening nail and when the nail is driven into the receiving material, such as by the use of a power-driven setting gun, the disk will be pushed back along the shaft into contact with the stainless or rust-resistant metal cap. After the driving-in operation, the disk will sit firmly against the fastened sheet metal and, together with the cap, will form a tight surrounding enclosure for the nail and prevent corrosion by moisture penetration to the head portion of the fastening element. In addition, the disk of ductile plastic provides a washer between the head of the anchoring nail and the material which is held to the foundation thereby.

In accordance with a further feature of the invention, the protective cap is applied to the head portion thereof. The cap is made of a sheet metal material and it may be, for example: steel which would be useful with steel sheets, aluminum for aluminum sheets, copper for copper sheets, brass for brass sheets, etc. The cap advantageously includes tabs which extend inwardly below the head at a location intermediate the height of annular side flanges of the cap and thus provide a form-closing seat for the cap and flanges which will extend downwardly into a form-enclosing engagement with the ductile plastic after the device is driven into the receiving material.

Accordingly, it is an object of the invention to provide a fastening element such as a bolt, nail or similar device adapted to be driven into a solid receiving material and including a head portion and a shank portion, a cap enclosing the head portion and a disk of ductile plastic material surrounding the shank portion, the ductile plastic material and the head portion being adapted to become juxtaposed after the fastening element is driven into the receiving material.

A further object of the invention is to provide a fastening element which is simple in design, rugged in construction, and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

DETAILED DESCRIPTION OF THE PREFERRED EMBODIMENT

Figure 1:
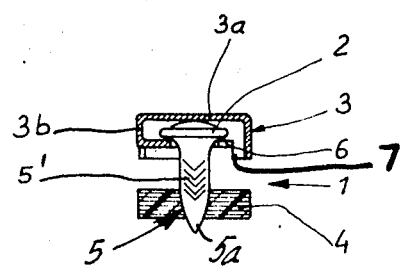
FIG. 1 is a partial elevational and partial sectional view of a fastening element constructed in accordance with the invention.
Figure 2:
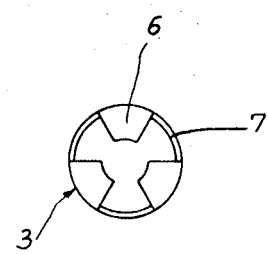
FIG. 2 is a bottom plan view of the cap indicated in FIG. 1.

Referring to the drawings, in particular, the invention embodied therein comprises a fastening element construction, generally designated 1, which includes a cap portion or cap 3 made of a corrosion-resistant material such as stainless steel. The cap 3 comprises a top cover sheet 3a which is adapted to rest on a head portion 2 of a fastening element 5 which, in this instance, is a nail which also includes a shank portion 5 terminating in a penetrating tip 5a. The cap 3 also includes an annular portion or flange 3b which extends substantially perpendicular to the covering sheet 3a. The flange 3b includes inwardly directed circumferentially spaced tabs 6 which grip under the head portion 2 of the fastening element 5 and insure a form-closing seat of the cap on the fastening element. The flange 3b also includes downwardly extending intermediate portions 7 defined between tabs 6 which are adapted to surround or engage into the material of a disk or washer 4 made of a ductile plastic.

Figure 3:
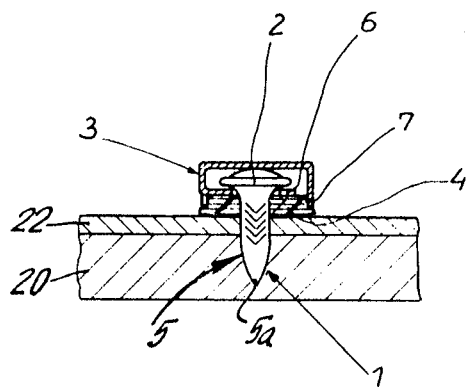
FIG. 3 is a sectional view through a receiving material with the fastening elements secured in position.

In the manufactured condition, the fastening element includes the cap 3 positioned over the head 2 and the washer 4 positioned over the lower end of the shank portion 5 as indicated in FIG. 1. After the fastening element is driven into a hard receiving material such as a steel sheet 22 thereto, as indicated in FIG. 3, the flange portions 7 of the cap 3 engage into the washer 4 and form a tight enclosure therewith. In addition, the washer bears against the tab 6 and the construction forms a completely locked corrosion-resistant enclosure for securing the sheet 22 to the sheet 20.

The fastening element, with the cap 3 and the washer 4 secured thereto, may be driven into the receiving material by the use of well-known setting tools wherein the driving energy is transmitted to the fastening element through a piston which is moved, for example, by the force of an explosive charge. During the driving in, the washer 4 moves upwardly along the shank portion 5 into locking engagement with the cap 3, thereby preventing any corrosion of the fastening nail and of the area of penetration of the nail through the sheets 22 and 20.

What is claimed is:

1. A fastening element, such as a bolt, nail, and the like for driving into a solid receiving material such as a steel sheet, comprising a fastening member including a shank portion having a penetrating end and a head portion of a larger diameter than said shank portion at the opposite end, a cap of corrosion-resistant material enclosing said head portion, and a ring of ductile plastic material surrounding said shank portion, said shank portion terminating in a penetrating tip, said cap being of a harder material than said ring and comprising a separate cap member having an annular flange extending axially downwardly from a flat head portion, said cap having a plurality of spaced tabs, said annular flange including inturned portions forming said tabs at circumferentially spaced locations which engage beneath said head, the portions of said flange between said inturned portions extending downwardly from said tabs for engagement with said plastic ring once the fastening element is driven into the receiving material.

2. A fastening element, according to claim 1, wherein said cap comprises a stainless and rust-resistant metal material.